United States Patent
Dathe et al.

(10) Patent No.: US 7,313,099 B2
(45) Date of Patent: Dec. 25, 2007

(54) PHASE SYSTEM ROTATION FOR POWER ESTIMATION

(75) Inventors: Lutz Dathe, Dresden (DE); Wolfram Kluge, Dresden (DE); Dietmer Eggert, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1198 days.

(21) Appl. No.: 10/284,644

(22) Filed: Oct. 31, 2002

(65) Prior Publication Data
US 2004/0001466 A1  Jan. 1, 2004

(30) Foreign Application Priority Data
Jun. 28, 2002  (DE) ................. 102 29 121

(51) Int. Cl.
*G01R 31/08* (2006.01)
(52) U.S. Cl. ............. 370/252; 370/206; 370/207; 375/329; 375/322; 702/189
(58) Field of Classification Search ............... None
See application file for complete search history.

(56) References Cited

U.S. PATENT DOCUMENTS 6,307,898 B1 * 10/2001 Ido .................. 375/326
6,614,806 B1    9/2003 Nanni
6,856,946 B2 *  2/2005 Dathe et al. ........... 702/189
2006/0209982 A1 *  9/2006 De Gaudenzi et al. ..... 375/279

FOREIGN PATENT DOCUMENTS

WO    94/18772    8/1994

* cited by examiner

*Primary Examiner*—Duc Ho
(74) *Attorney, Agent, or Firm*—Meyertons Hood Kivlin Kowert & Goetzel, P.C.; B. Noël Kivlin

(57) ABSTRACT

A receiver, an integrated circuit chip and a method are provided for estimating the power of a digitally modulated signal received by the receiver in a communication system. The method comprises determining in-phase and quadrature-phase values of a phase constellation system relating to the received signal, calculating at least one modified in-phase value and at least one modified quadrature-phase value relating to the phase constellation system rotated by a predetermined angle, and determining absolute values of the in-phase and quadrature-phase values and the modified in-phase and quadrature-phase values. The method further comprises identifying the maximum of the absolute values, and determining a power estimate of the received signal based on the identified maximum value. The provided technique may allow for estimating the power of a digitally modulated signal in a simple and less complex implementation.

33 Claims, 15 Drawing Sheets

PHASE SYSTEM ROTATION FOR POWER ESTIMATION

BACKGROUND OF THE INVENTION

1. Field of the Invention

The invention generally relates to processing digitally modulated signals received in a communication system such as a WLAN (Wireless Local Area Network) system, and in particular to a receiver, an integrated circuit chip and an operation method that may be used for estimating the power of a received signal.

2. Description of the Related Art

A wireless local area network is a flexible data communication system implemented as an extension to, or as an alternative for, a wired LAN. Using radio frequency or infrared technology, WLAN systems transmit and receive data over the air, minimizing the need for wired connections. Thus, WLAN systems combine data connectivity with user mobility.

Most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to the 802.11b standard, that allows data rates of 5.5 and 11 Mbps in the 2.4 GHz spectrum. This extension is backwards compatible as far as it relates to the direct sequence spread spectrum technology, and both standards adopt various digital modulated techniques.

A digitally modulated signal in a wireless local area network has to be processed to compensate the influence of disturbances and to keep the output power constant. For compensating power changes in the input digitally modulated signal, usually an automatic gain control loop unit is provided in the receiver. A typical block diagram of such an automatic gain control loop unit is illustrated in FIG. 1. The unit of FIG. 1 comprises an amplifier 100 and a feedback loop having a power calculation unit 110 and a gain control unit 120. The power calculation unit 110 calculates the current power of the output signal of said amplifier 100, and the gain control unit 120 delivers a gain control signal to the amplifier 100.

The amplitude or power of any digitally modulated signal may be represented by I (in-phase) and Q (quadrature-phase) values and the I and Q values can be displayed in a complex diagram. The I value represents the real part and the Q value represents the imaginary part of the signal. When the power calculation unit 110 calculates the output power it has to calculate a square root of the sum of the squared I value and the squared Q value for each received pair of I and Q values.

The conventional techniques for calculating the output power comprise unnecessary and complicated calculation steps. In particular the calculation of the squared I and Q components and the calculation of the square root is disadvantageous. It has been found that circuits used for calculation of the power are needed to be of significant complexity and are therefore responsible for high development and manufacturing costs.

SUMMARY OF THE INVENTION

An improved receiver, integrated circuit chip and operation method are provided that may allow for performing a power estimation in a simple and less complex implementation.

In one embodiment, there is provided a method of estimating the power of a digitally modulated signal received by a receiver in a communication system. The method comprises determining in-phase and quadrature-phase values of a phase constellation system relating to the received signal, calculating at least one modified in-phase value and at least one modified quadrature-phase value relating to the phase constellation system rotated by a predetermined angle, and determining absolute values of the in-phase and quadrature-phase values and the modified in-phase and quadrature-phase values. The method further comprises identifying the maximum of the absolute values, and determining a power estimate of the received signal based on the identified maximum value.

In a further embodiment, there is provided a receiver for receiving a digitally modulated signal in a communication system. The receiver comprises a signal processing unit that is adapted for determining in-phase and quadrature-phase values of a phase constellation system relating to the received signal, and a calculation unit adapted for calculating at least one modified in-phase value and at least one modified quadrature-phase value relating to the phase constellation system rotated by a predetermined angle. The above mentioned signal processing unit is further adapted for determining absolute values of the in-phase and quadrature-phase values and the modified in-phase and quadrature-phase values, and identifying the maximum of the absolute values. The receiver further comprises a power estimation unit adapted for determining a power estimate of the received signal based on the identified maximum value.

In another embodiment, an integrated circuit chip may be provided for processing a digitally modulated signal received in a communication system. The integrated circuit chip comprises a signal processing circuit that is adapted for determining in-phase and quadrature-phase values of a phase constellation system relating to the received signal, and a calculation circuit adapted for calculating at least one modified in-phase value and at least one modified quadrature-phase value relating to the phase constellation system rotated by a predetermined angle. The above mentioned signal processing circuit is further adapted for determining absolute values of the in-phase and quadrature-phase values and the modified in-phase and quadrature-phase values, and identifying the maximum of the absolute values. The integrated circuit chip further comprises a power estimation circuit for determining a power estimate of the received signal based on the identified maximum value.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following, and more particular description of the invention as illustrated in the accompanying drawings, wherein.

DETAILED DESCRIPTION OF THE INVENTION

The illustrative embodiments of the present invention will be described with reference to the figure drawings, wherein like elements and structures are indicated with like reference numbers.

Figure 1:
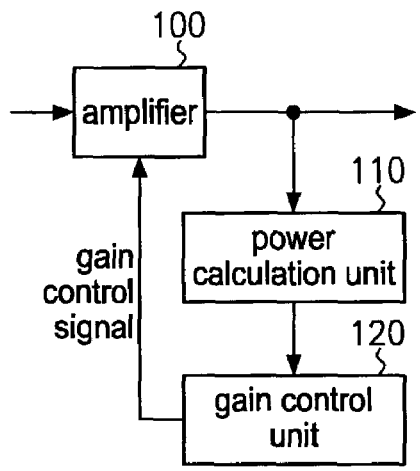
FIG. 1 is a typical block diagram of a conventional automatic gain control loop for controlling the gain of the amplifier.
Figure 2:
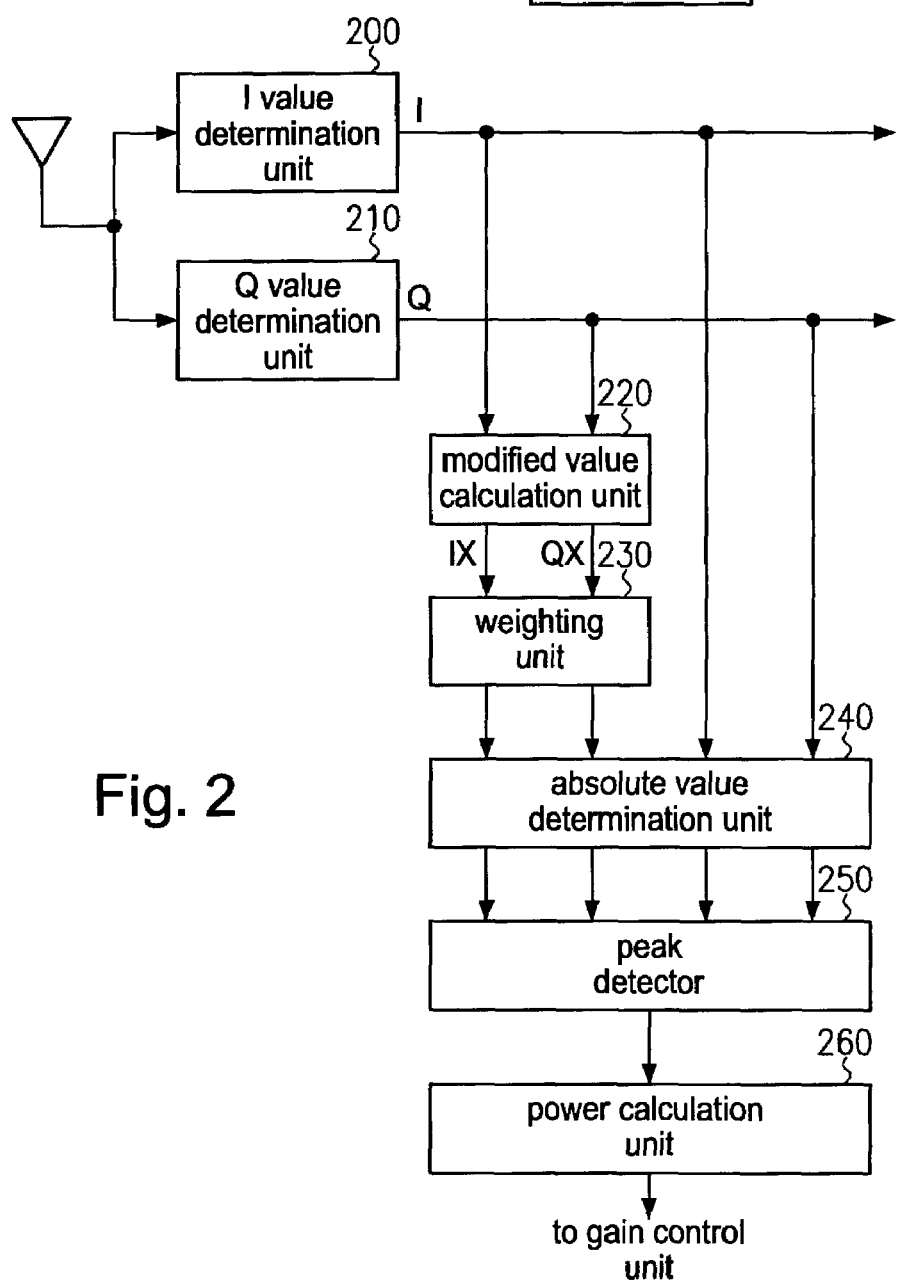
FIG. 2 is a block diagram of a power estimation unit according to an embodiment and indicates the signal flow between the different units.

Referring now to the drawings, in particular to FIG. 2, a block diagram is depicted of the power estimation unit according to an embodiment. An antenna receives a digitally modulated signal and the received signal is split into its I and Q components by an I value determination unit 200 and a Q value determination unit 210, respectively. The I and Q values represent the real part and the imaginary part, respectively, of the power of the received digitally modulated signal.

A calculation unit 220 determines an IX value by calculating the difference of the I value and the Q value and dividing the result by a factor of two:

$$IX = \frac{I - Q}{2}$$

The calculation unit 220 further determines a QX value by calculating the sum of the I value and the Q value, and dividing the result by a factor of two:

$$QX = \frac{I + Q}{2}$$

The IX and QX values are then input to a weighting unit 230. The weighting unit 230 multiplies the IX value and the QX value with a factor of the square root of two, i.e. $\sqrt{2}$. The weighted IX and QX values represent a point of a phase constellation system that is rotated by 45°.

The weighted IX and QX values and the originally received I and Q values are input to an absolute value determination unit 240 for calculating the absolute values of each of the I, Q, IX and QX values. The absolute value determination unit 240 is connected to a peak detector 250 which identifies the maximum of all absolute values that are input to the peak detector 250. The now available peak value is input to a power calculation unit 260 for calculating a power estimate of the received signal. The power estimate may be used to control the gain of a subsequent amplifier to compensate for input power changes and to keep the output power constant.

Figure 3:
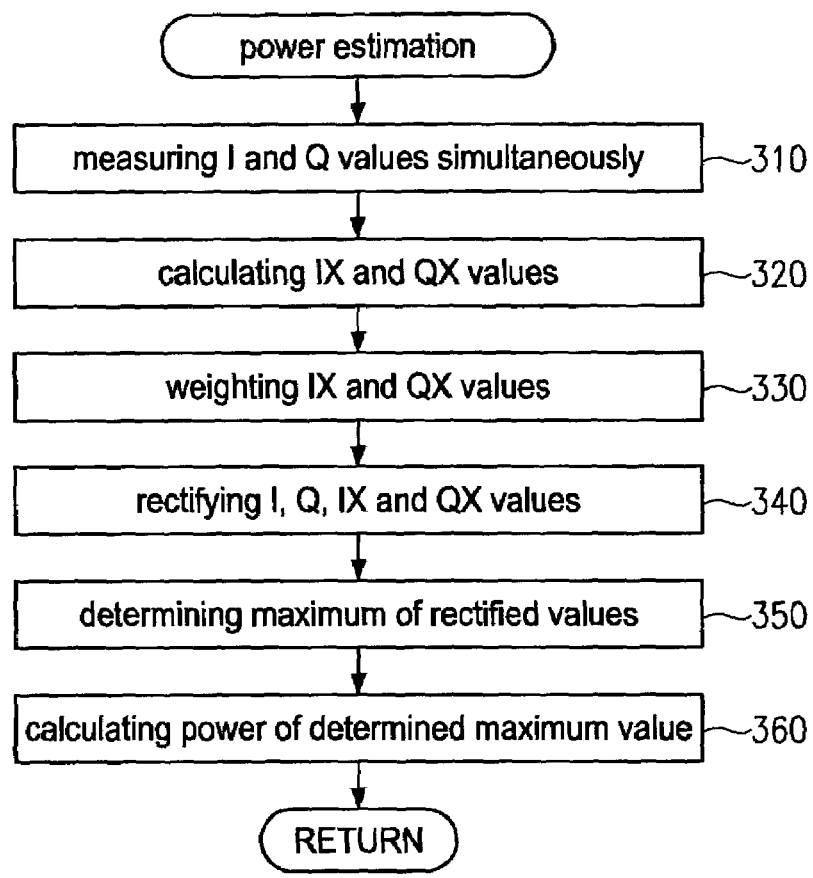
FIG. 3 is a flow chart illustrating the process of performing the power estimation according to an embodiment.

With reference to FIG. 3, the illustrated flow chart describes a method of the power estimation according to an embodiment. In the first step 310, I and Q values are measured simultaneously. The next step 320 comprises the calculation of the IX and QX values, i.e. the creation of a new complex signal within a 45° rotated constellation system.

The power estimation process comprises in the subsequent step the weighting 330 of the IX and QX values by multiplying the values with a factor of the square root of two ($\sqrt{2}$).

The I and Q values and the weighted IX and QX values are now available for being rectified in step 340. The rectified I, Q, IX and QX values are then processed in a maximum determination step 350 to determine a maximum value of the rectified values, and provides the maximum value for the power calculation step 360. This step 360 calculates a power estimate which may be used to control the gain of a subsequent amplifier.

At the end of the power estimation process, the entire process may step back to repeat the power estimation with new measured I and Q values.

Figure 4:
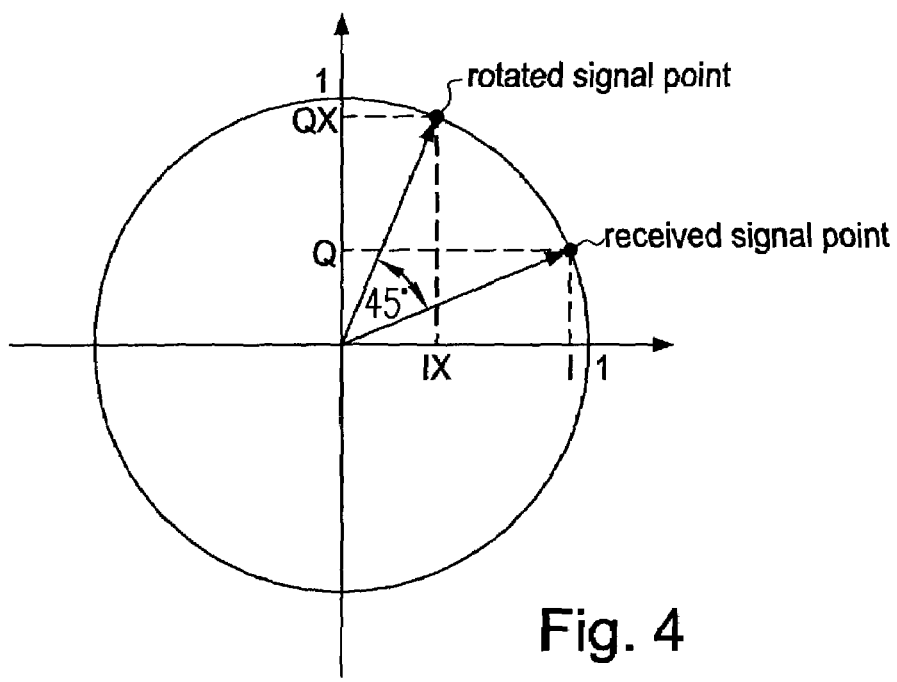
FIG. 4 illustrates a phase constellation system wherein the I and Q values represent a phase constellation point of the received signal, and the IX and QX values represent the phase constellation point rotated by 45°.

FIG. 4 illustrates a phase constellation system wherein the I and Q values define the position of the received signal point. As apparent from FIG. 2, the weighted IX and QX values are determined by the calculation unit 220 and the weighting unit 230. The weighted IX and QX values define the position of the received signal point, rotated by 45°.

As mentioned above, a power calculation may be performed in an automatic gain control loop. For this purpose, the receiver may use a passive impedance network.

Figure 5:
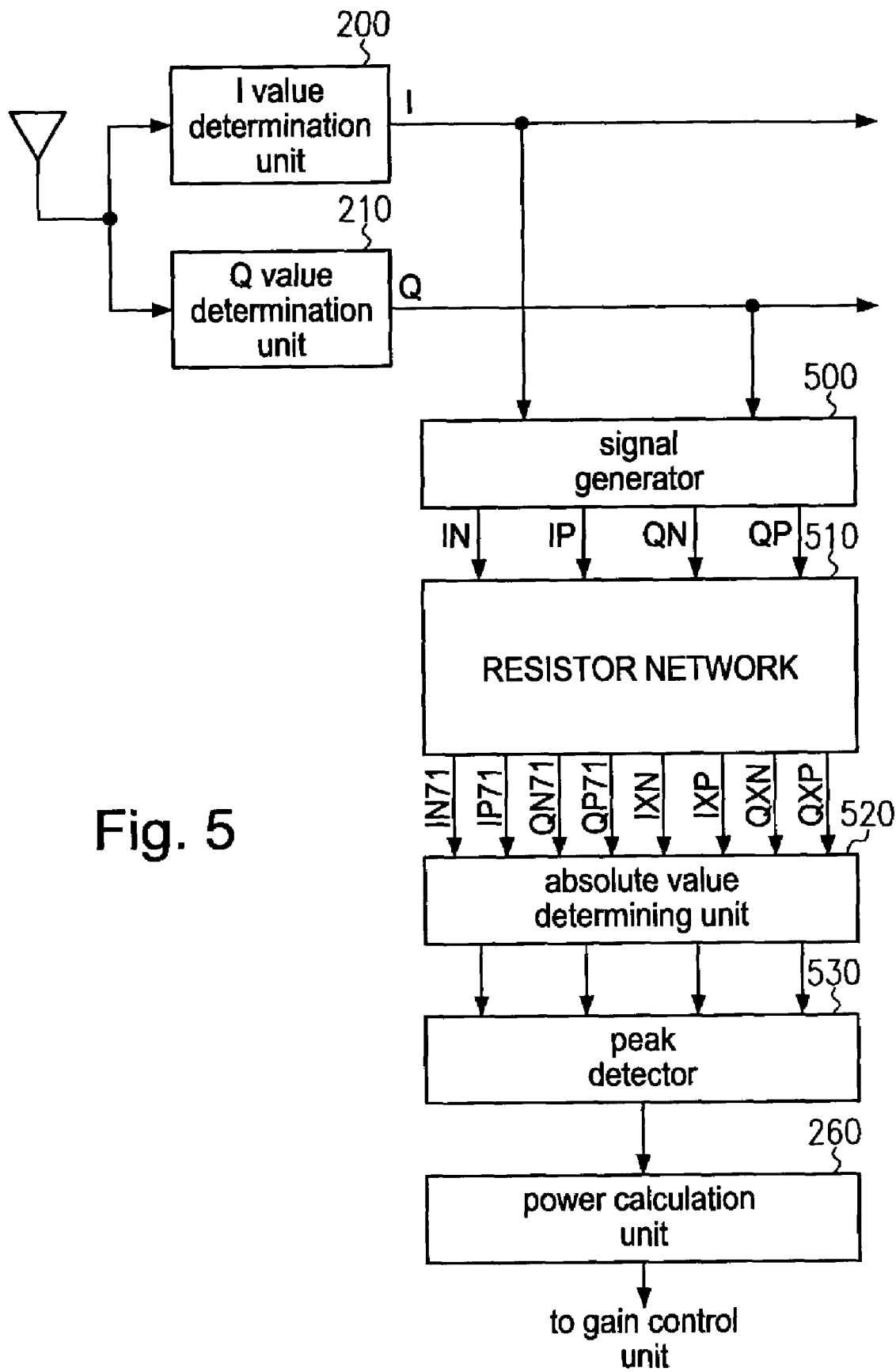
FIG. 5 is a block diagram of a power estimation unit according to another embodiment, implementing a resistor network.

Referring now to FIG. 5, a block diagram is depicted of the power estimation unit according to another embodiment. As above, an antenna receives a digitally modulated signal and the received signal is split in its I and Q components by an I value determination unit 200 and a Q value determination unit 210, respectively. The I and Q values in the complex diagram will be explained in more detail later.

The I and Q values are input signals to a signal generator 500. The signal generator 500 generates an IN and IP value, and a QN and QP value. The IN value is phase shifted by 180° relative to the phase of the IP value. The QN value is phase shifted by 180° relative to the phase of the QP value. The generated IN and IP values represent the negative or positive originally received I value and the generated QN and QP values represent the negative or positive originally received Q value, respectively. The signal generator is connected to a resistor network 510 and the generated IN, IP, QN and QP values are input to the resistor network.

The resistor network 510 comprises a plurality of resistors which are connected to scale down the input signals by a predetermined damping factor and to output the down scaled signals QN71, QP71, IN71 and IP71. The resistors are further connected for providing the output signals IXN, IXP, QXN and QXP. The resistor network will be explained in more detail later.

All output signals of the resistor network 510 are input to an absolute value determining unit 520. The absolute value determining unit 520 determines the absolute values for each input value. The absolute value determining unit 520 is connected to a peak detector 530 which identifies the maximum of the absolute values delivered from the absolute value determining unit 520. The identified maximum value is now input to the power calculation unit 260. The power calculation unit 260 calculates a power estimate that may be used to control a gain of a subsequent amplifier.

The power estimation process performed by the device of FIG. 5 will now be explained with reference to FIG. 6. In the flow chart, the I and Q values are measured simultaneously in step 300. In step 600, the IN, IP, QN and QP values are generated using the measured I and Q values. As mentioned above, the IN value is phase shifted by 180° relative to the phase of the IP value and the QN value is phase shifted by 180° relative to the phase of the QP value.

Figure 6:
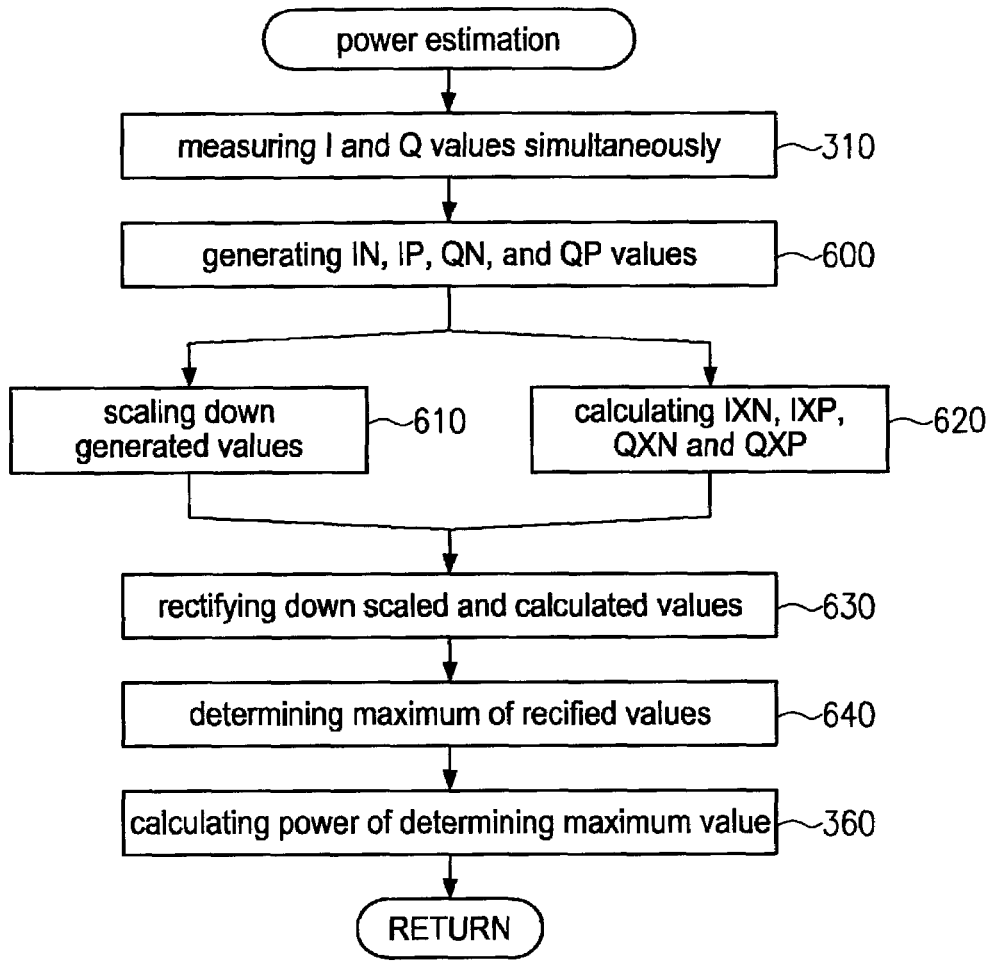
FIG. 6 is a flow chart illustrating the process of performing the power estimation using the resistor network of FIG. 5.

As shown in FIG. 6, the power estimation process then splits into step 610 of scaling the values down and step 620 of calculating the rotated values. Both steps of the power estimation process may be performed simultaneously, using the IN, IP, QN and QP values previously generated.

Step 610 scales down the input values by a factor of the inverse (reciprocal) of the square root of two, and delivers the down scaled values IN71, IP71, QN71 and QP71 to the rectifying unit 520. Step 620 calculates the IXN, IXP, QXN and QXP values which are also delivered to the rectifying unit 520.

The rectifying step 630 determines the absolute value for each previously determined value, and in step 640, the maximum of all rectified values is identified. The identified maximum value is now used in the power calculation step 360 to calculate a power estimate which may then be used to control the gain of a subsequent amplifier.

Again, the power estimation process may return to step back to repeat the entire process using a resistor network with new measured I and Q values.

Figure 7:
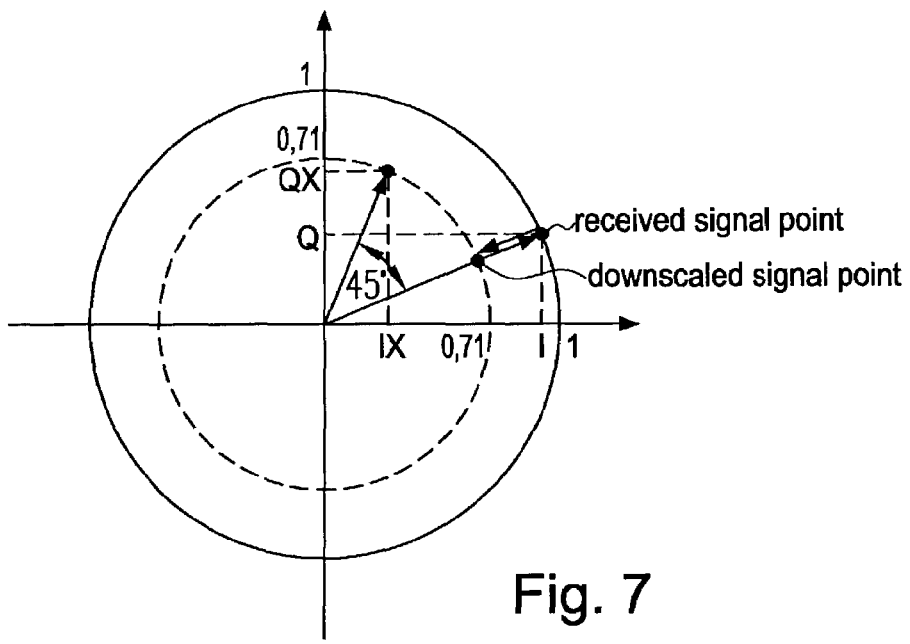
FIG. 7 illustrates another phase constellation system.

As mentioned before, the I and Q values can be displayed in a phase constellation system. FIG. 7 shows a phase constellation system wherein the I and Q values define a phase constellation point of a received signal. Downscaling the phase constellation point of the received signal by a factor of an inverse of the square root of two ($1/\sqrt{2}$) results in a downscaled signal point located on the depicted dashed circle line. This dashed circle line represents a level of a phase constellation system that is shrunken by the factor of an inverse of the square root of two.

The downscaled signal point represents the related pair of the output signals IN71, IP71, QN71 and QP71 of the resistor network 510 in FIG. 5. In addition, when operating the resistor network 510, a signal point in the shrunken phase constellation system is generated that is rotated by 45°. The position of the rotated signal point in the phase constellation system is defined by the IX and QX values. The rotated signal point represents the related pair of the resistor network output signals IXN, IXP, QXN and QXP.

Figure 8:
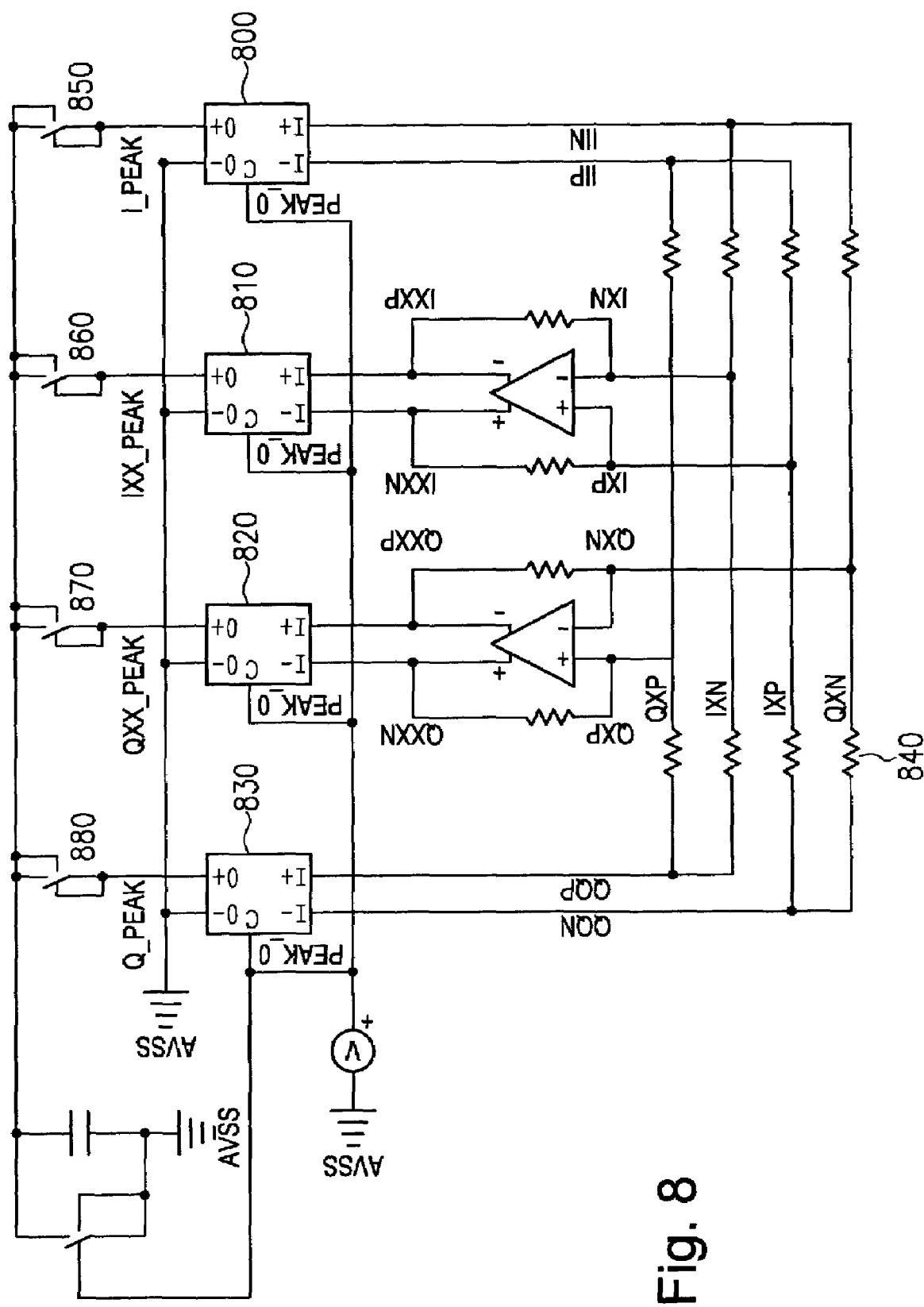
FIG. 8 illustrates the realization of the power estimation unit with electronic devices in electronic circuits according to an embodiment.

Turning now to FIG. 8, the electronic devices are shown that may be used to perform the power estimation process. The depicted resistors 840 are connected to form the modified value calculation unit 220 and the resistors of the present embodiment have all the same resistor values.

Four peak detector devices 800 to 830 are implemented in the circuit of FIG. 8 for identifying the maximum of the respective signal. Each peak detector is connected to receive a clear signal to be reset. Further, four electronic switches 850 to 880 are provided to switch the output signals to the output terminals, thereby acting as diodes.

The function of the resistor network will now be explained in more detail with reference to FIG. 9. The signal generator 500 is connected to the resistor network 510 and delivers the IN, IP, QN and QP values to respective input terminals of the resistor network 510. Between the IN and IP input terminals, and between the QN and QP input terminals, there is provided a resistor divider, to generate the downscaled values. Further, the resistor network comprises a plurality of resistors which each have the same resistor value, to generate the rotated signal point values.

The output terminals IN71 and IP71 provide the I input signals, downscaled by a first resistor divider connected between the IN and IP input terminals. The output terminals QN71 and QP71 provide the Q input signals, downscaled by a second resistor divider that is connected between the QN and QP input terminals. The downscale factor for the IN71, IP71, QN71 and QP71 is the inverse of the square root of two. Thus, downscaling effects a shift of the received signal point in the phase constellation system down to the dashed circle line of FIG. 7.

Figure 9:
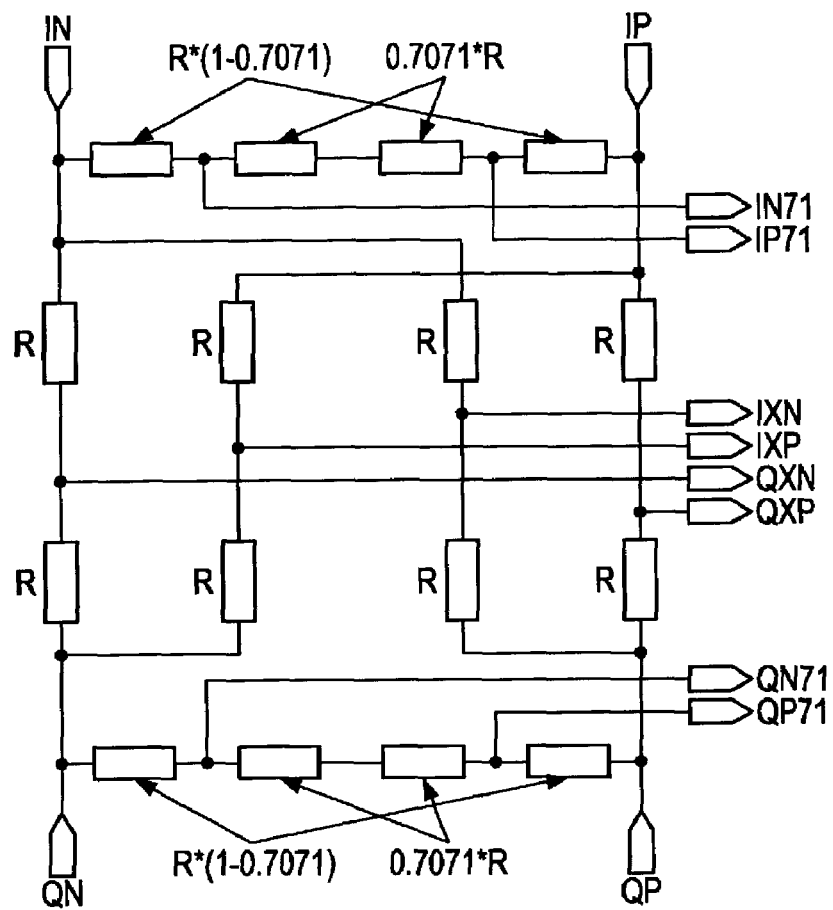
FIG. 9 illustrates the resistor network of FIG. 5 with its input and output terminals.

Still discussing FIG. 9, the resistors are connected for delivering both the IN71, IP71, QN71 and QP71 values and the IXN, IXP, QXN and QXP values. As apparent from the above formulas, IXN and IXP represent a difference of the related resistor network input signals and QXN and QXP represent the sum of the resistor network input signals, respectively.

Determining the sum and the difference by means of the resistor network 510 effects both a reduction of the amplitude by a factor of the inverse of square root of two, and a rotation by 45° in the phase constellation system. Thus, the resulting signal point is positioned on the dashed circle of FIG. 7, in addition to the signal point that is generated by downscaling the input signals by means of the resistor dividers.

To summarize, the resistor network 510 provides the IN71, IP71, QN71, QP71 output signals as well as the IXN, IXP, QXN and QXP output signals. In the power estimation process, the output signals of the resistor network 510 are then rectified and the maximum of the rectified signals is input to the power calculation unit 260 for calculating a power estimate.

Figure 10:
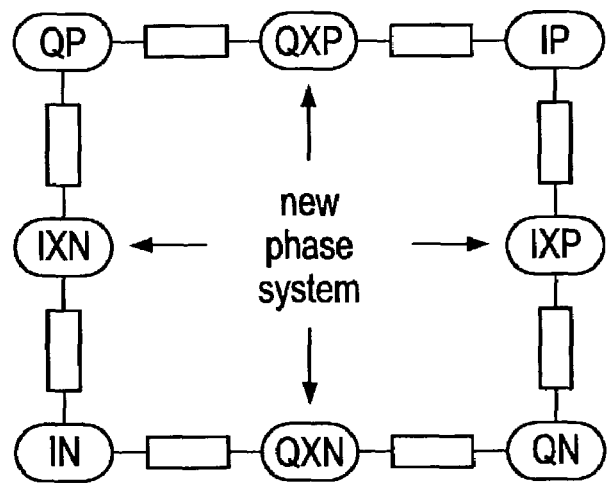
FIG. 10 shows the constellation of the rotated phase constellation system, relating to the original phase constellation system.

FIG. 10 shows schematically the constellation of the input and the output terminals connected via resistors.

Figure 11:
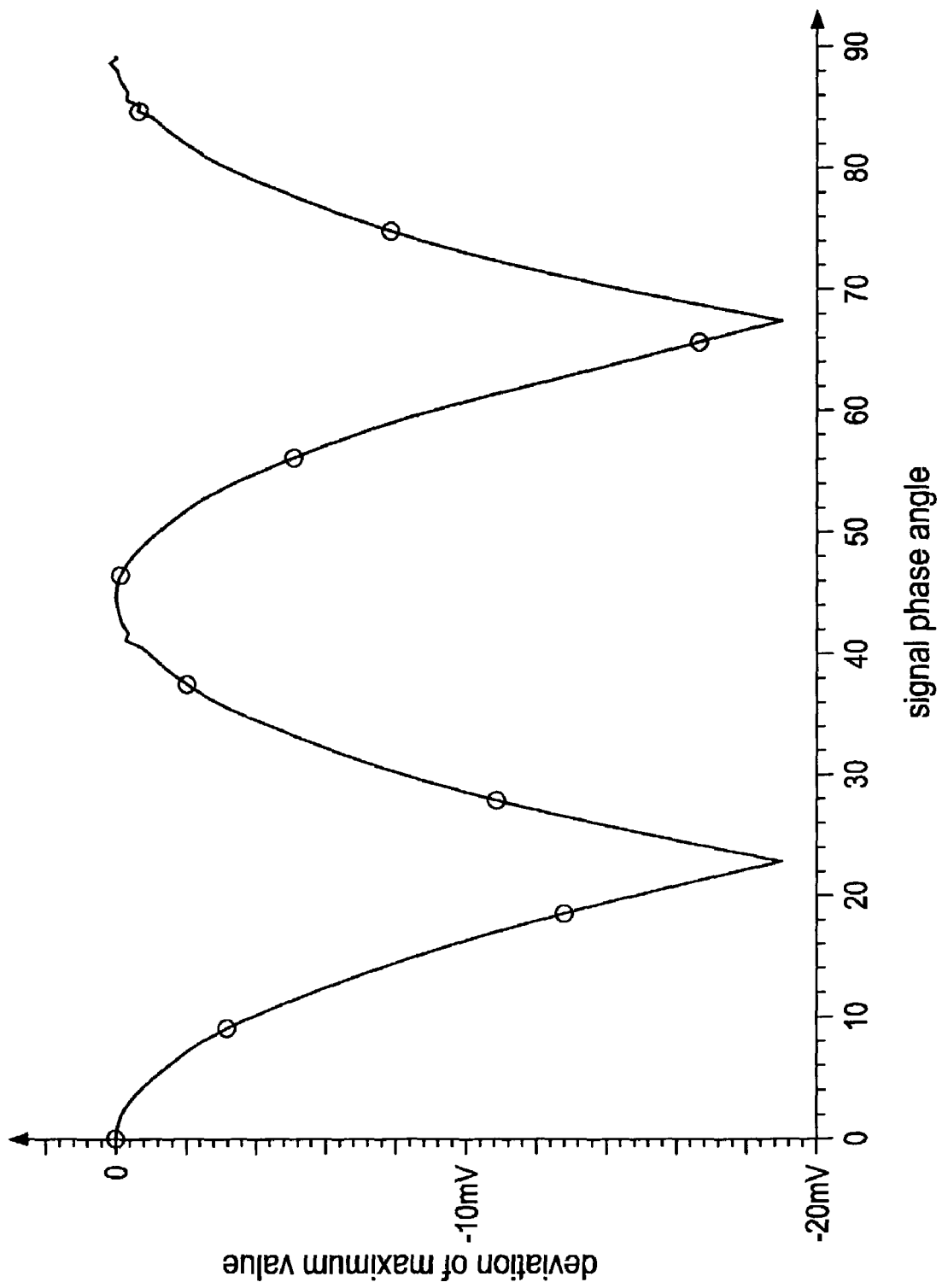
FIG. 11 illustrates the function of the deviation of the maximum value from the true value depending on the signal phase angle.
Figure 12:
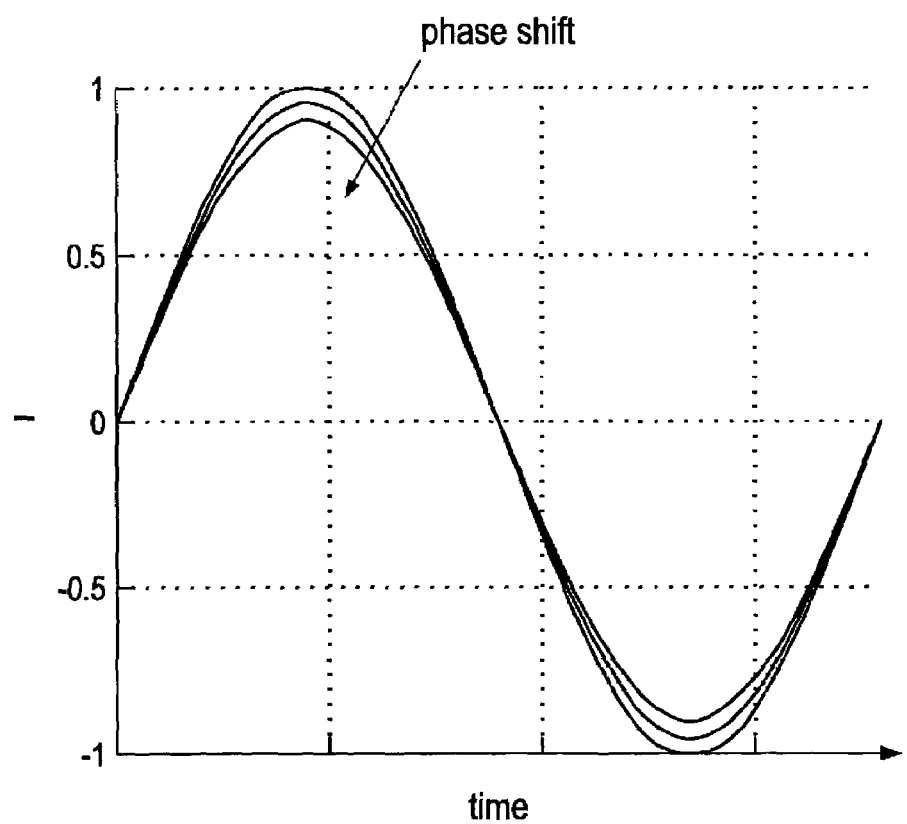
FIG. 12 illustrates a BPSK modulated I signal represented in the time domain for a subset of phase shifts between 0° and 36°.
Figure 13:
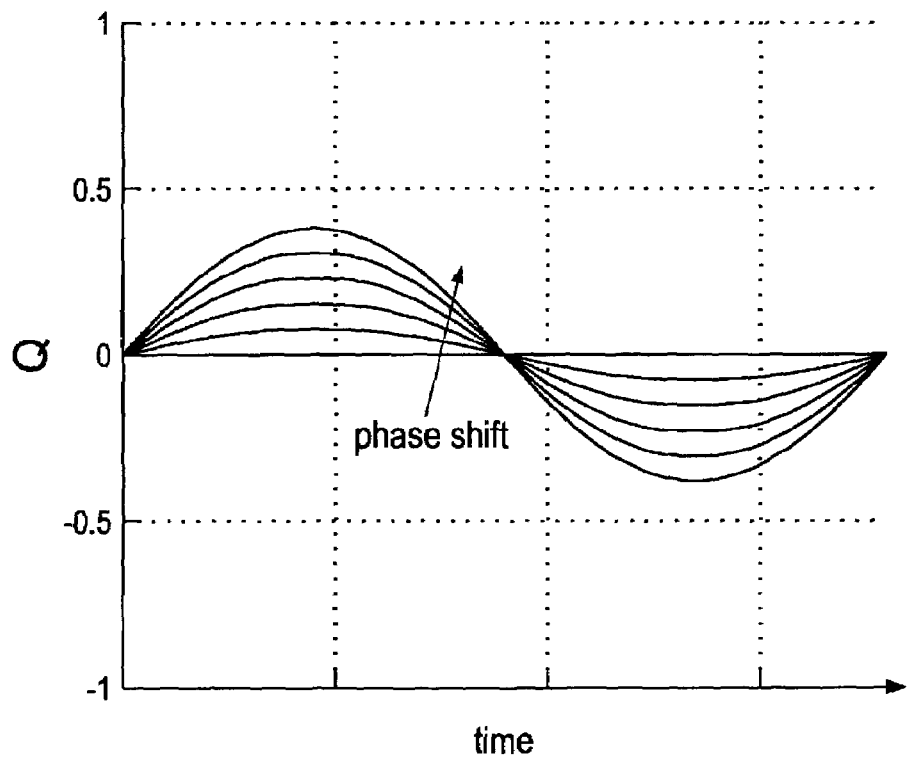
FIG. 13 illustrates a BPSK modulated Q signal represented in the time domain for a subset of phase shifts between 0° and 36°.
Figure 14:
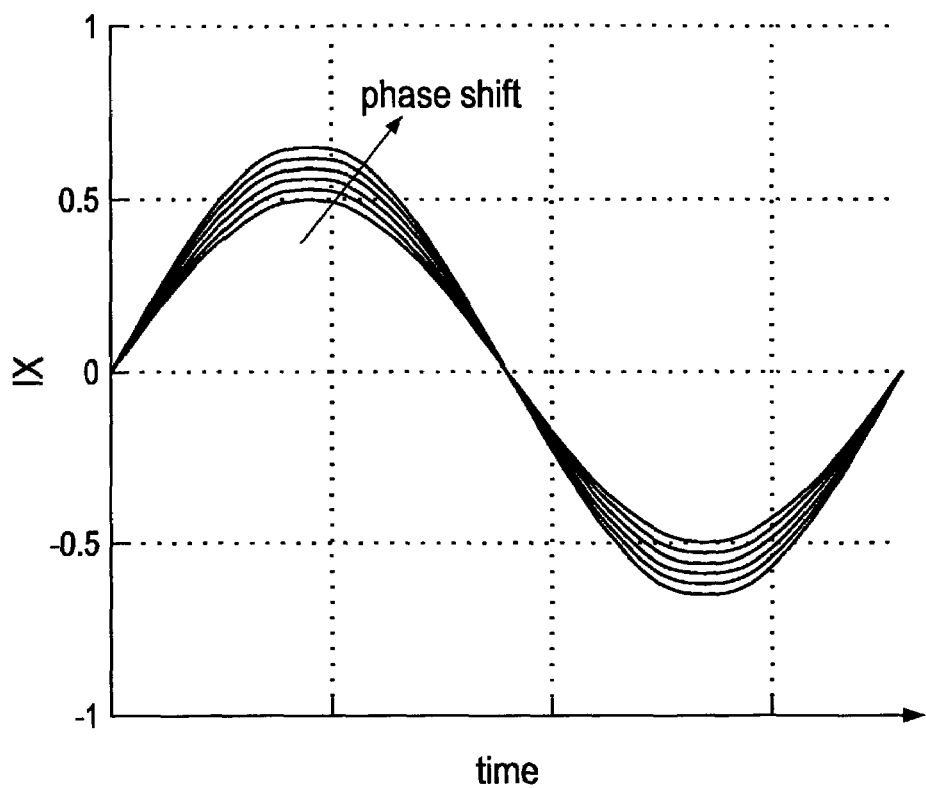
FIG. 14 illustrates the IX signal represented in the time domain for a subset of phase shifts between 0° and 36°.
Figure 15:
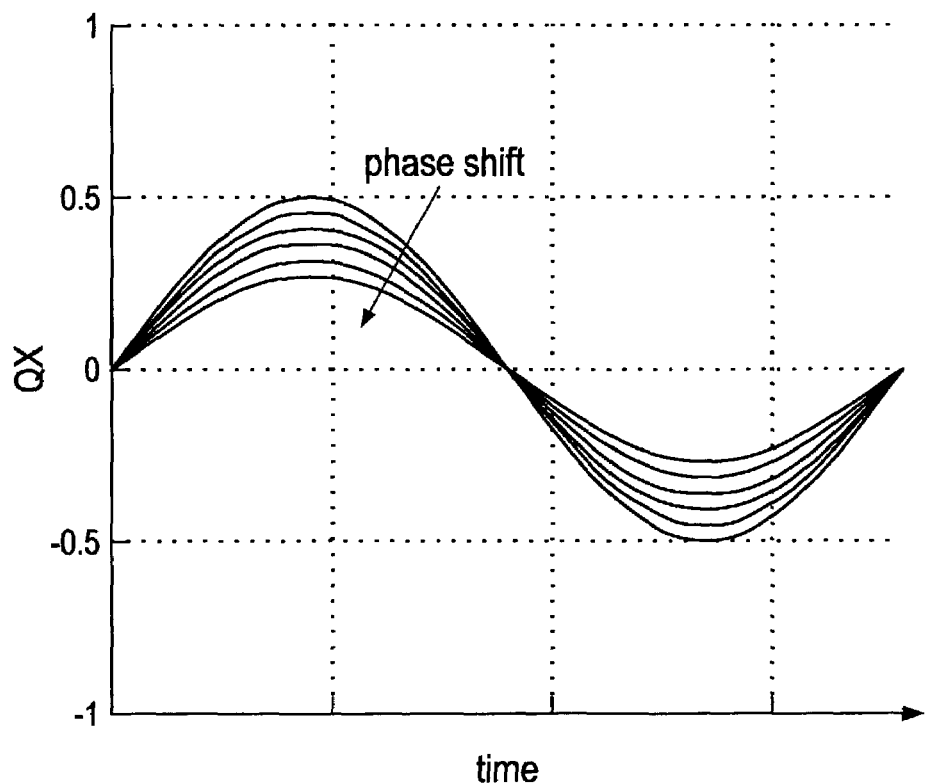
FIG. 15 illustrates the QX signal represented in the time domain for a subset of phase shifts between 0° and 36°.

Referring now to FIG. 11, the deviation of the maximum value depending on the signal phase angle is illustrated. The function of the deviation has a periodic form and shows a local maximum at the signal phase angle of 22.5°. The deviation function has its maximum recurring in steps of 45°.

Examples of signal waveforms will now be discussed for explaining in detail the operation of the power estimation unit according to one of the embodiments. For this purpose, reference is made to FIGS. 12 to 27.

FIGS. 12 to 15 illustrate the BPSK modulated I, Q, IX and QX signals in the time domain for a subset of phase shift angles between 0° and 36°. The phase shiftings influence the amplitude of the signal, and the direction of the variation of the amplitude of the signal is indicated by an arrow.

Figure 16:
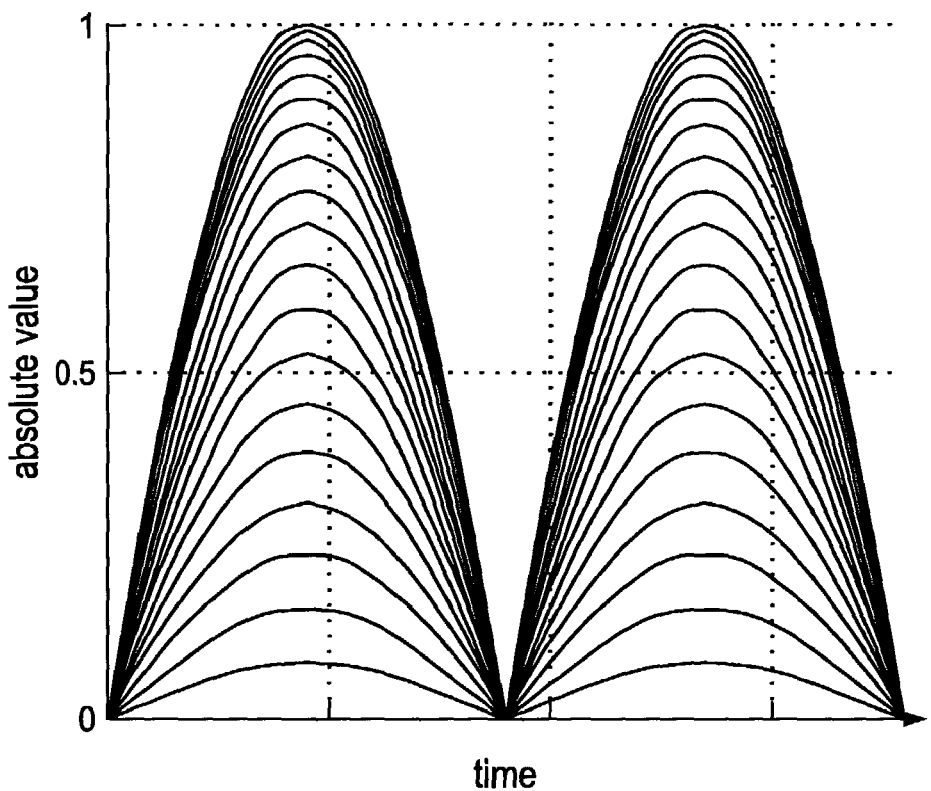
FIG. 16 illustrates an overlay of the absolute values of the Q signal, I signal, QX signal and IX signal, represented in the time domain for a subset of phase shifts between 0° and 36°.

The diagram in FIG. 16 illustrates an overlay of the rectified I, Q, IX and QX signals for a subset of phase shift angles between 0° and 36°.

Figure 17:
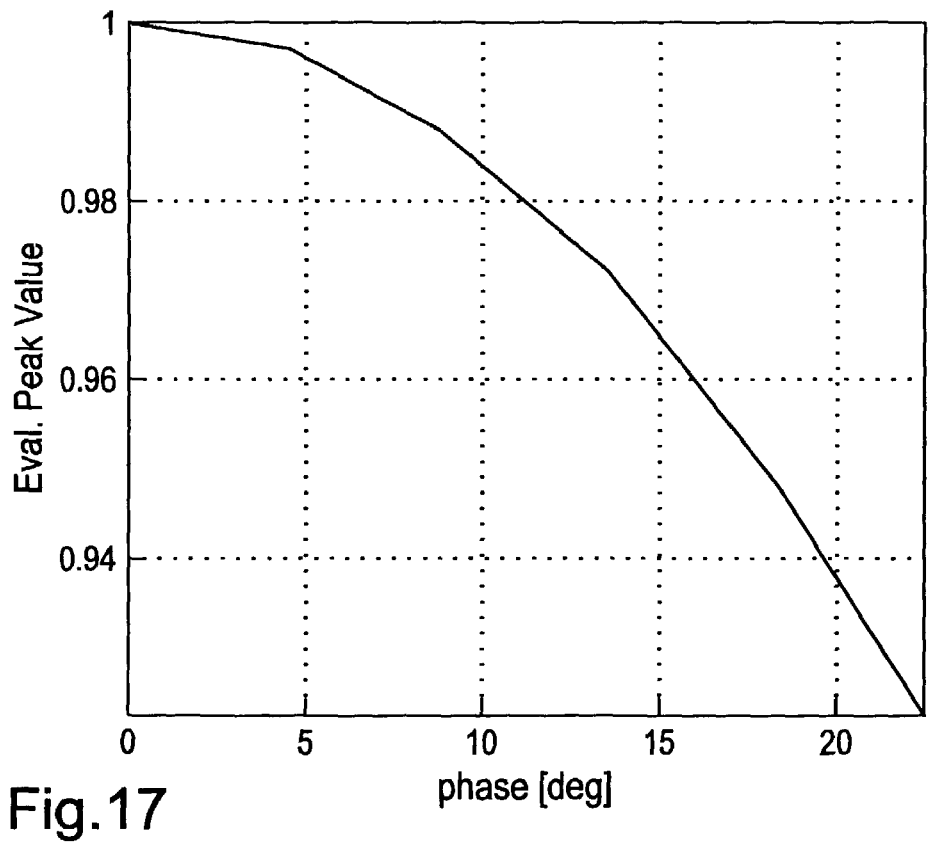
FIG. 17 illustrates the envelope of the maximum of all absolute values of the Q signal, I signal, QX signal and IX signal represented in the phase domain.
Figure 18:
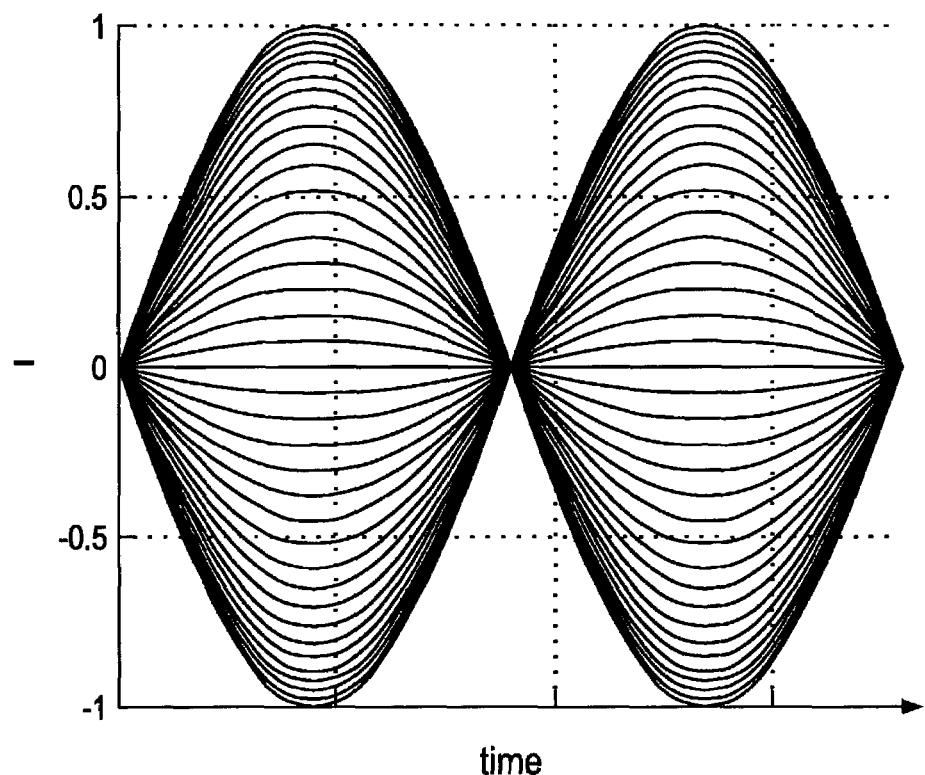
FIG. 18 illustrates a BPSK modulated I signal represented in the time domain for phase shifts between 0° and 36°.
Figure 19:
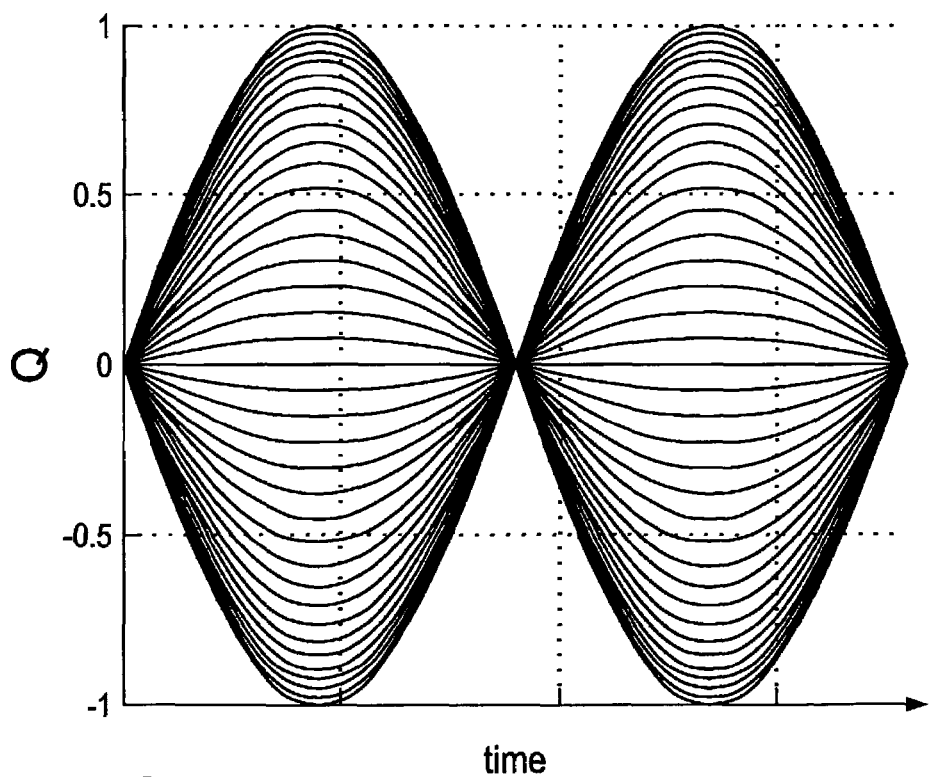
FIG. 19 illustrates a BPSK modulated Q signal represented in the time domain for phase shifts between 0° and 36°.
Figure 20:
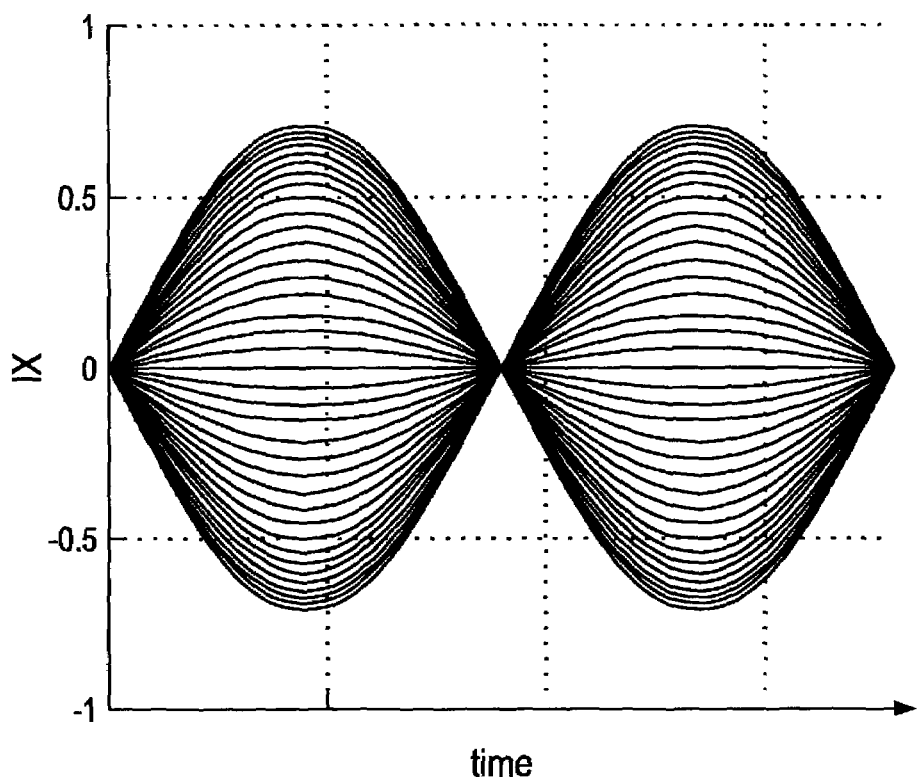
FIG. 20 illustrates the IX signal represented in the time domain for phase shifts between 0° and 360°.
Figure 21:
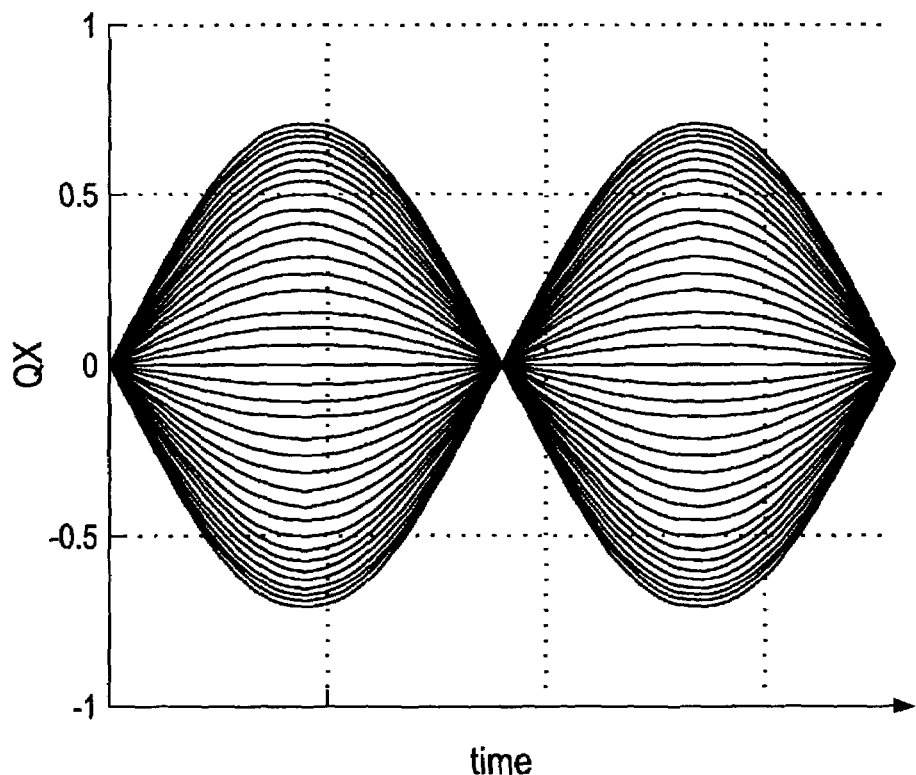
FIG. 21 illustrates the QX signal represented in the time domain for phase shifts between 0° and 360°.

FIG. 17 shows the envelope of the peak value depending on the phase that has a maximum peak value at 0° phase, and a maximum deviation at 22.5°. The curve of FIG. 17 can be thought as corresponding to the most left portion of the curve FIG. 11.

FIGS. 18 to 21 illustrates the I, Q, IX and QX signals in the time domain for a phase shift angle between 0° and 360°. The phase shiftings influence the amplitude of the signal and each plotted function represents a respective phase shift angle.

Figure 22:
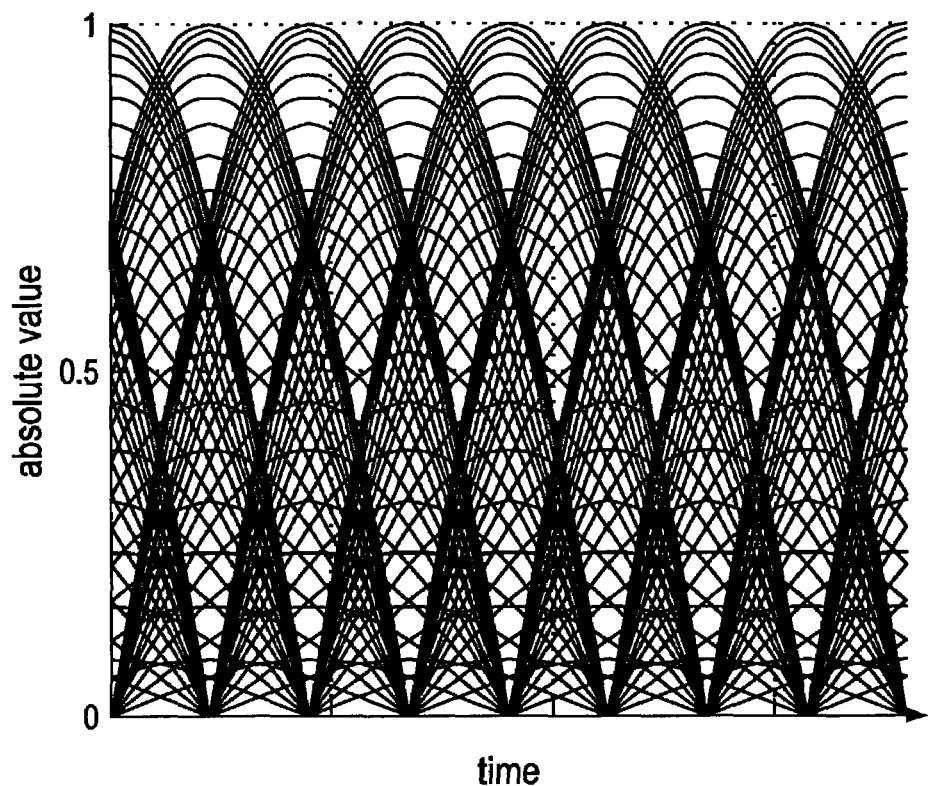
FIG. 22 illustrates an overlay of the absolute values of the Q signal, I signal, QX signal and IX signal, represented in the time domain for phase shifts between 0° and 360°.

FIG. 22 illustrates an overlay of the rectified I, Q, IX and QX signals depicted for a phase shift angle between 0° and 360°.

Figure 23:
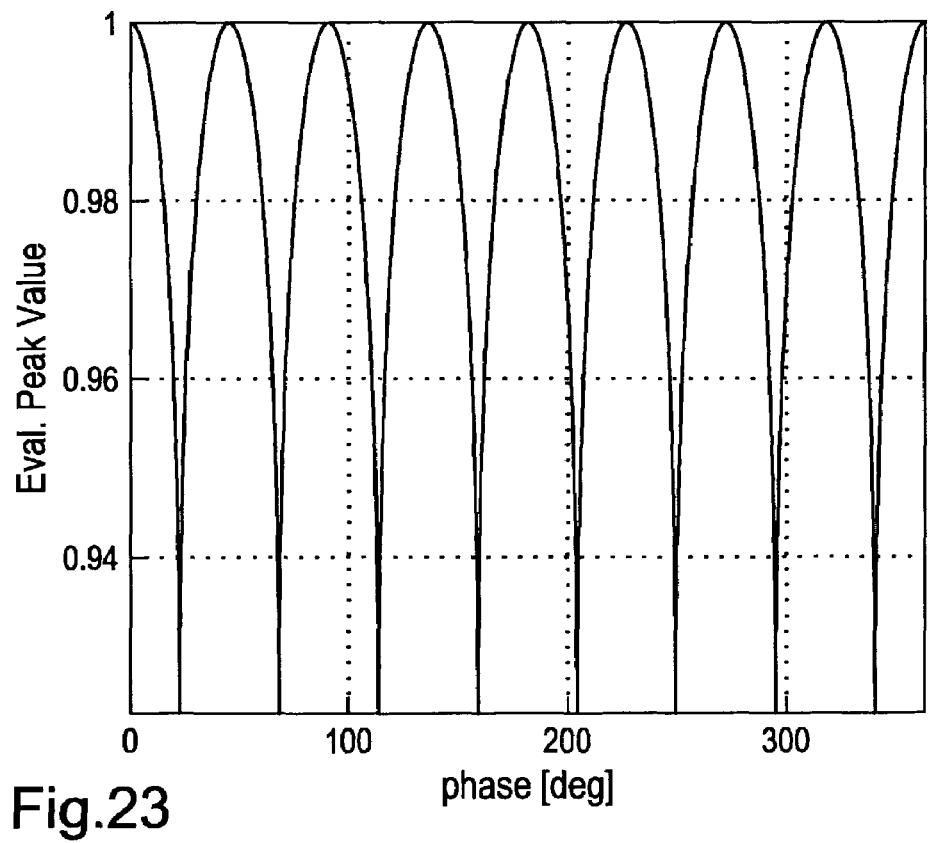
FIG. 23 illustrates the envelope of the maximum of all absolute values of the Q signal, I signal, QX signal and IX signal represented in the phase domain for phase.
Figure 24:
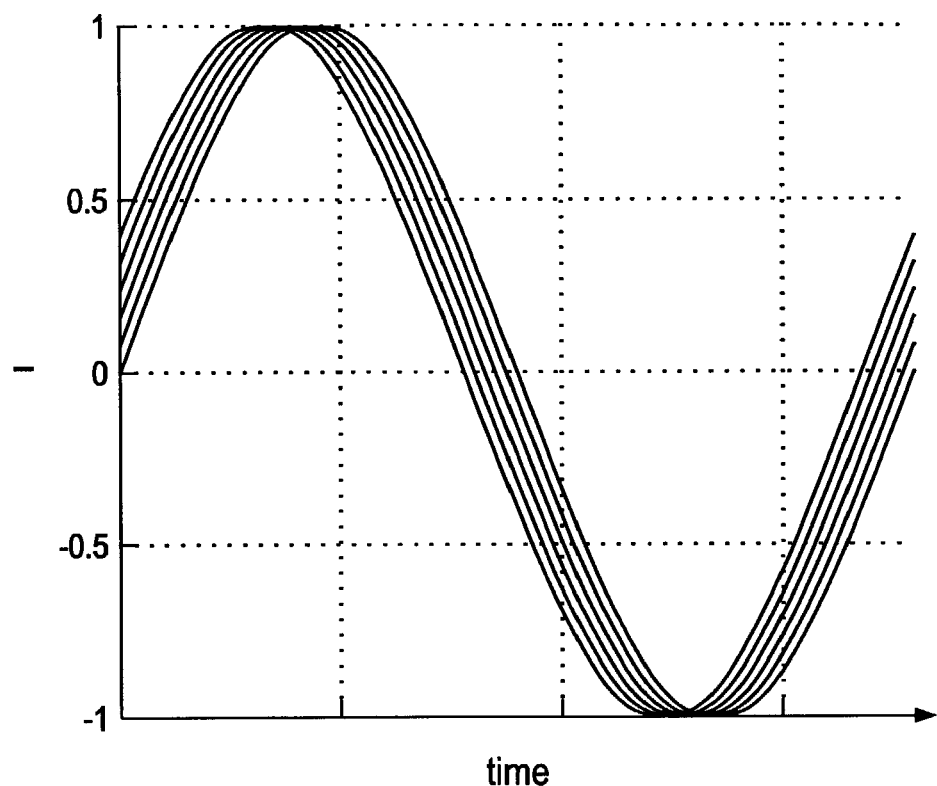
FIG. 24 illustrates a QPSK modulated I signal represented in the time domain for a subset of phase shifts between 0° and 36°.
Figure 25:
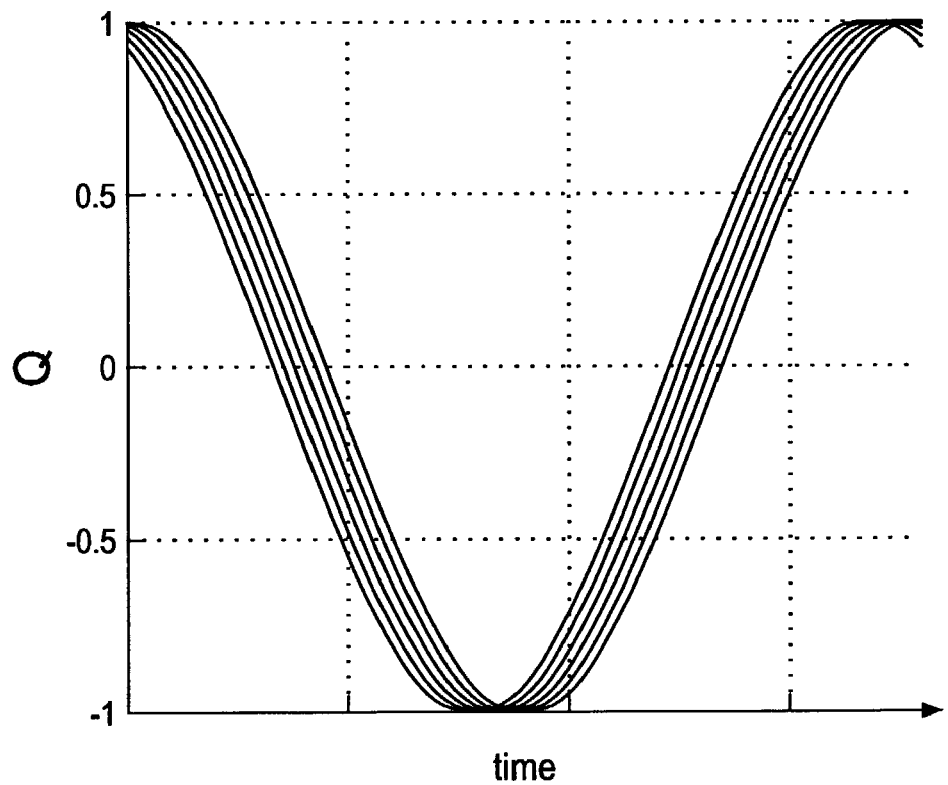
FIG. 25 illustrates a QPSK modulated Q signal represented in the time domain for a subset of phase shifts between 0° and 36°.
Figure 26:
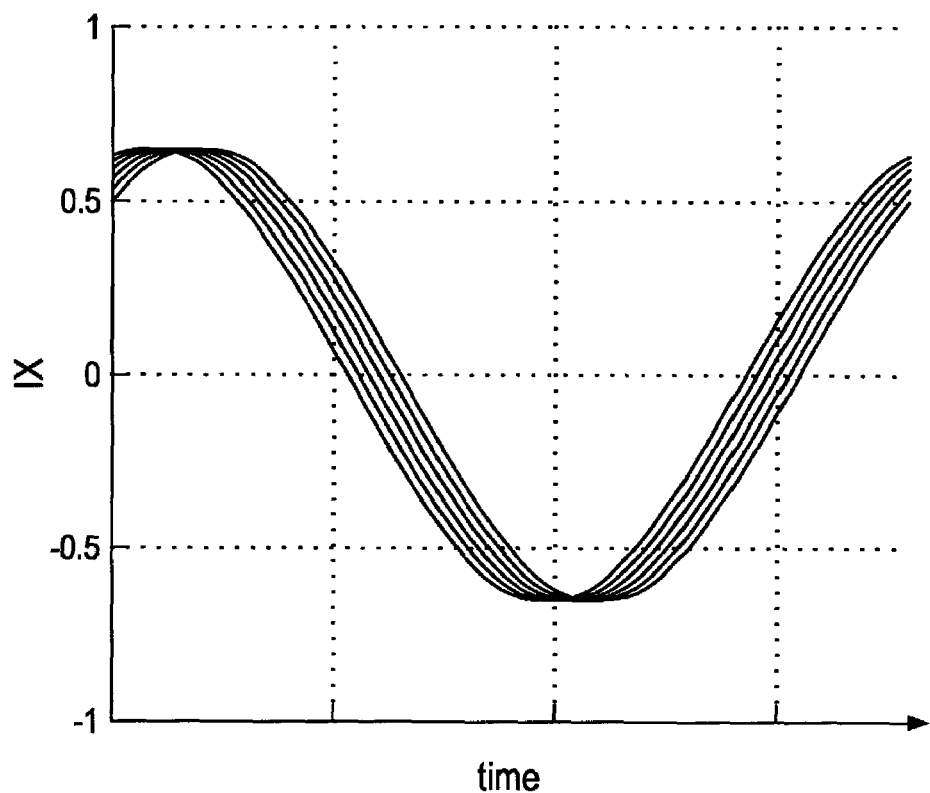
FIG. 26 illustrates a QPSK modulated IX signal represented in the time domain for a subset of phase shifts between 0° and 36°.
Figure 27:
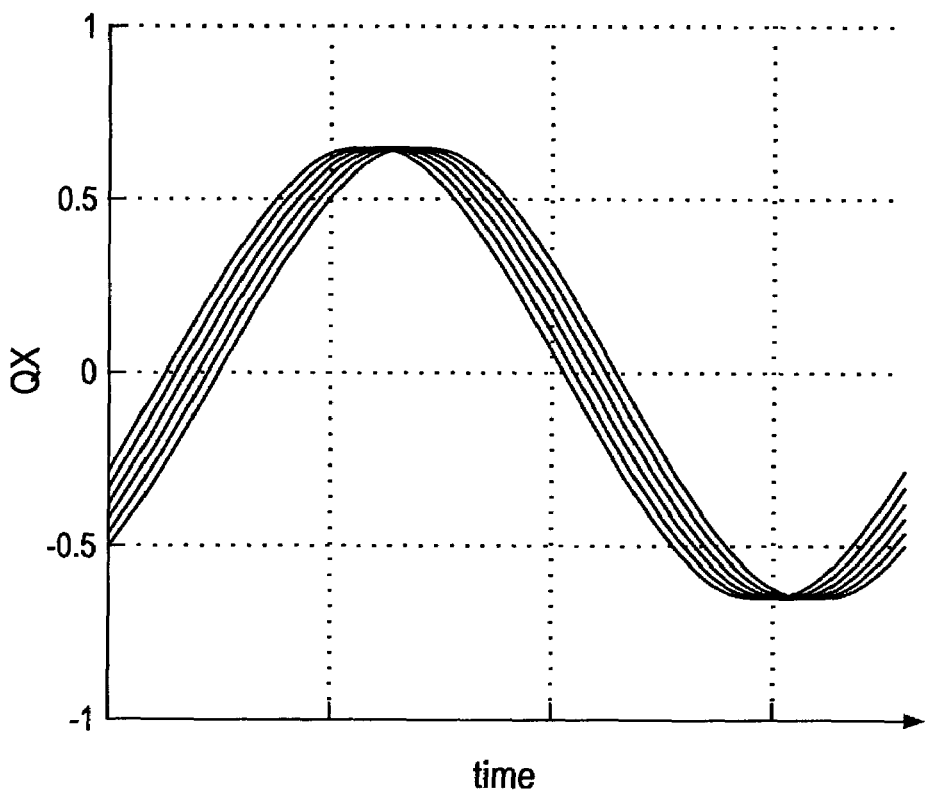
FIG. 27 illustrates a QPSK modulated QX signal represented in the time domain for a subset of phase shifts between 0° and 36°.

FIG. 23 illustrates the envelope of the maximum of the rectified I, Q, IX and QX signals in dependency of the phase between 0° and 360°. The plotted maximum value shows a periodic form wherein the maximum is at 0° and is recurring in steps of 45°.

FIGS. 24 to 27 correspond to FIGS. 12 to 15 but illustrate QPSK modulated I, Q, IX and QX signals in the time domain for a subset of phase shift angles between 0° and 36°.

As apparent from the foregoing description, all of the embodiments as described may advantageously provide a high-precision, high-accuracy and high-density technique that may be used in particular in an automatic gain control loop, thus improving overall efficiency.

The arrangements may have the advantage to allow for a process such as the power estimation process wherein solving of complicated formulas is no longer necessary.

Further, the arrangements may have the advantage due to the fact that a resistor network is used for voltage scaling of signals. This allows for evaluating the power of a digitally modulated signal without using an active amplifier having a gain of the square root of two. Avoiding active elements in the circuits reduces power consumption.

Moreover, the manufacturing is simplified and therefore, the above described embodiments effect lower production costs.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order not to unnecessarily obscure the invention described herein. Accordingly, it is to be understood that the invention is not to be limited by the specific illustrative embodiments, but only by the scope of the appended claims.

The invention claimed is:

1. A method of operating a receiver in a communication system, the method comprising the steps of:
   receiving a digitally modulated signal; and
   estimating the power of said digitally modulated signal by:
     determining in-phase and quadrature-phase values of a phase constellation system relating to the received signal;
     calculating at least one modified in-phase value and at least one modified quadrature-phase value relating to the phase constellation system rotated by a predetermined angle;
     determining absolute values of said in-phase and quadrature-phase values and said modified in-phase and quadrature-phase values;
     identifying the maximum of said absolute values; and
     determining a power estimate of said received signal based on said identified maximum of said absolute values.

2. The method of claim 1, wherein the predetermined angle is 45°.

3. The method of claim 2, wherein calculating the modified in-phase value comprises subtracting said quadrature-phase value from said in-phase value and dividing the subtraction result by two.

4. The method of claim 3, wherein calculating the modified in-phase value further comprises multiplying the result of said division by the square root of two.

5. The method of claim 2, wherein calculating the modified quadrature-phase value comprises adding said quadrature-phase value to said in-phase value and dividing the sum by two.

6. The method of claim 5, wherein calculating the modified quadrature-phase value further comprising multiplying the result of said division by the square root of two.

7. The method of claim 1, wherein said step of determining the absolute values comprises rectifying signals representing said in-phase and quadrature-phase values and said modified in-phase and quadrature-phase values, respectively.

8. The method of claim 7, wherein said step of rectifying comprises operating an electronic switch.

9. The method of claim 7, wherein said step of rectifying comprises operating a diode.

10. The method of claim 1, wherein said received signal is a QPSK (Quadrature Phase Shift Keying) signal.

11. The method of claim 1, wherein said received signal is a BPSK (Binary Phase Shift Keying) signal.

12. The method of claim 1, adapted to be performed in an automatic gain control loop of the receiver.

13. The method of claim 1, wherein in the step of determining said in-phase and quadrature-phase values, the in-phase and quadrature-phase values are determined simultaneously.

14. The method of claim 1, wherein the frequency of said received signal is one frequency of plurality frequencies of a band limited spectrum.

15. The method of claim 1, wherein calculating the modified in-phase and quadrature-phase values is performed for any signal point of the rotated phase constellation system.

16. The method of claim 1, wherein calculating the modified in-phase and quadrature-phase values is performed for one signal point of the rotated phase constellation system.

17. A receiver for receiving a digitally modulated signal in a communication system, comprising:
a signal processing unit adapted for determining in-phase and quadrature-phase values of a phase constellation system relating to the received signal; and
a calculation unit adapted for calculating at least one modified in-phase value and at least one modified quadrature-phase value relating to the phase constellation system rotated by a predetermined angle;
wherein said signal processing unit is further adapted for determining absolute values of said in-phase and quadrature-phase values and said modified in-phase and quadrature-phase values, and identifying the maximum of said absolute values;
wherein the receiver further comprises:
a power estimation unit adapted for determining a power estimate of said received signal based on said identified maximum of said absolute values.

18. The receiver of claim 17, wherein the predetermined angle is 45°.

19. The receiver of claim 18, wherein said calculation unit is further adapted for calculating the modified in-phase value by subtracting said quadrature-phase value from said in-phase value and dividing the subtraction result by two.

20. The receiver of claim 19, wherein said calculation unit is further adapted for multiplying the result of said division by the square root of two.

21. The receiver of claim 18, wherein said calculation unit is further adapted for calculating the modified quadrature-phase value by adding said quadrature-phase value to said in-phase value and dividing the sum by two.

22. The receiver of claim 21, wherein said calculation unit is further adapted for multiplying the result of said division by the square root of two.

23. The receiver of claim 17, wherein said signal processing unit is adapted for determining said absolute values by rectifying signals representing said in-phase and quadrature-phase values and modified in-phase and quadrature-phase values, respectively.

24. The receiver of claim 23, wherein said signal processing unit comprises diodes for rectifying signals representing said in-phase and quadrature-phase values and modified in-phase and quadrature-phase values, respectively.

25. The receiver of claim 17, wherein said signal processing unit comprises at least one electronic switch for determining said absolute values.

26. The receiver of claim 17, wherein said digitally modulated signal is a QPSK (Quadrature Phase Shift Keying) signal.

27. The receiver of claim 17, wherein said digitally modulated signal is a BPSK (Binary Phase Shift Keying) signal.

28. The receiver of claim 17, having an automatic gain control loop comprising said signal processing unit, said calculation unit and said power estimation unit.

29. The receiver of claim 17, wherein said signal processing unit is further adapted for determining said in-phase and quadrature-phase values simultaneously.

30. The receiver of claim 17, further adapted for receiving the digitally modulated signal with one specific frequency of a plurality of frequencies of a band limited spectrum.

31. The receiver of claim 17, wherein said calculation unit is further adapted for calculating the modified in-phase and quadrature-phase values for any signal point of the rotated phase constellation system.

32. The receiver of claim 17, wherein said calculation unit is further adapted for calculating the modified in-phase and quadrature-phase values for one signal point of the rotated phase constellation system.

33. An integrated circuit chip for processing a digitally modulated signal received in a communication system, comprising:
a signal processing circuit adapted for determining in-phase and quadrature-phase values of a phase constellation system relating to the received signal; and
a calculation circuit adapted for calculating at least one modified in-phase value and at least one modified quadrature-phase value relating to the phase constellation system rotated by a predetermined angle;
wherein said signal processing circuit is further adapted for determining absolute values of said in-phase and quadrature-phase values and said modified in-phase and quadrature-phase values, and identifying the maximum of said absolute values;
wherein the integrated circuit chip further comprises:
a power estimation circuit for determining a power estimate of said received signal based on said identified maximum of said absolute values.

* * * * *